(12) United States Patent
Yearsley et al.

(10) Patent No.: US 8,051,235 B1
(45) Date of Patent: Nov. 1, 2011

(54) CONDITIONAL BACK-TO-BACK INTERRUPT VECTORING

(75) Inventors: Gyle D. Yearsley, Boise, ID (US);
Joshua J. Nekl, Boise, ID (US)

(73) Assignee: IXYS CH GmbH (CH)

( * ) Notice: Subject to any disclaimer, the term of this patent is extended or adjusted under 35 U.S.C. 154(b) by 1290 days.

(21) Appl. No.: 11/271,453

(22) Filed: Nov. 11, 2005

(51) Int. Cl.
*G06F 13/24* (2006.01)
(52) U.S. Cl. ........................ 710/269; 712/220
(58) Field of Classification Search .............. 712/220; 710/269
See application file for complete search history.

(56) References Cited

U.S. PATENT DOCUMENTS

| | | | | |
|---|---|---|---|---|
| 5,640,548 | A * | 6/1997 | Langan et al. | 712/220 |
| 7,185,159 | B2 * | 2/2007 | Beinet et al. | 711/163 |
| 2004/0215860 | A1 * | 10/2004 | Armstrong et al. | 710/260 |

OTHER PUBLICATIONS

MC68HC11 Reference Manual, M68HC11RM/D, Rev. 6, Apr. 2002, 650 pp., p. 31 (http://www.freescale.com/files/microcontrollers/doc/ref_manual/M68HC11RM.pdf, accessed Mar. 30, 2007).*
MC68HC11 Reference Manual, M68HC11RM/D, Rev. 6, Apr. 2002, 650pp, pp. 1,180, 190-191 (http://www.freescale.com/files/microcontrollers/doc/ref_manual/M68HC11RM.pdf, accessed Aug. 29, 2007).*
Presentation Slides, "ARM in MCU" at Zilog Aug. 19, 2004, by John Sharp ARM MCU Segment Manager, ARM Holdings plc, 31 pages.

* cited by examiner

*Primary Examiner* — Clifford Knoll
(74) *Attorney, Agent, or Firm* — Imperium Patent Works; T. Lester Wallace; Zheng Jin

(57) ABSTRACT

Upon execution of an interrupt return (IRET) instruction when a second interrupt is pending, rather than popping a stack, obtaining processor state information, and then pushing the state information back onto the stack prior to vectoring off to a second interrupt service routine, direct vectoring is employed such that the stack is not pushed or popped but rather the processor vectors directly from the IRET instruction in the first interrupt service routine to the second interrupt service routine. A novel stored interrupt enable (SIE) bit stores whether maskable interrupts were enabled at the time the first interrupt service routine was entered. Execution of IRET automatically checks the SIE. If the SIE indicates interrupts were enabled, then direct vectoring occurs. If the SIE indicates that interrupts were disabled, then the second interrupt remains pending, and an interrupt return operation is performed by popping the stack and restoring the prior processor state.

15 Claims, 2 Drawing Sheets

CONDITIONAL BACK-TO-BACK INTERRUPT VECTORING

TECHNICAL FIELD

The present invention relates to interrupts, and more particularly to the handling of back-to-back interrupts.

BACKGROUND

A conventional processor can receive an interrupt at the same time that it is servicing another interrupt. Consider a situation where a processor is executing a thread of instructions when a first interrupt occurs. The state of the conventional processor (including status flag information and a program counter value) is pushed onto a stack, maskable interrupts are disabled, and the processor vectors off to a first interrupt service routine for handling the first interrupt. If the conventional processor were to complete execution of the first interrupt service routine, then the processor would encounter an interrupt return instruction at the end of the interrupt service routine. Execution of this interrupt return instruction would cause the state of the processor that was previously pushed onto the stack to be popped off. The recovered state information would then be used to restore the processor to the state it was in when the processor vectored off to the first interrupt service routine. After the state was restored, the processor could continue executing the thread of instructions as if the first interrupt had never occurred.

Consider next a situation where a second interrupt (a maskable interrupt) occurs during the conventional processor's execution of the first interrupt service routine. The second interrupt is not serviced because maskable interrupts are automatically disabled during execution of the first interrupt service routine. The maskable interrupt is therefore pending but is not serviced. When the processor encounters the interrupt return instruction at the end of the first interrupt service routine, it pops the previously stored state information off the stack and returns to execution of the thread. Before execution of the thread resumes, however, the second interrupt causes the processor to push the state of the processor onto the stack, to disable maskable interrupts again, and to vector off to the second interrupt service routine. The processor then begins executing the second interrupt service routine.

Note that returning from the first interrupt service routine and proceeding to the second interrupt service routine causes a popping of the stack to recover state information and then immediately causes that popped state information to be pushed back onto the stack so that the second interrupt service routine can be executed. This popping and pushing performed by the conventional processor is wasteful of processing resources and slows execution of the overall program.

It is believed that a prior art processor architecture exists, where a processor executing a first interrupt service routine encounters an interrupt return instruction when a second interrupt is pending, and where the processor does not pop state information off the stack and return to the thread due to the pending second interrupt, but rather jumps to a predetermined location where an instruction is stored. The instruction is fetched, decoded and executed. Execution causes an address to be loaded into the program counter. The address is the starting address of an interrupt service routine for handling the second interrupt. After the loading of the starting address into the program counter, the processor begins execution of the interrupt service routine for the second interrupt. Unnecessary popping and pushing of the same information onto the stack is avoided, but the mechanism is cumbersome, inefficient and slow. One or more program memory locations are required to support the function. An improved mechanism is desired that reduces the amount of silicon area consumed. Not only is a faster and smaller mechanism desired, but it has also been recognized that a situation can exist where the pending second interrupt is a maskable interrupt. Software should be able to mask, or disable, maskable interrupts. If the interrupt servicing described above is practiced in a situation where the second interrupt is a maskable interrupt, then upon termination of the first interrupt routine the jumping to the second interrupt routine will cause the second interrupt routine to be executed. Even though the second interrupt was masked, the processor nonetheless will jump to its second interrupt service routine. Although software can be written to detect this situation and accommodate for it, an improved mechanism is desired that does not involve this complexity. An efficient and fast solution is desired that provides back-to-back vectoring involving maskable interrupts.

SUMMARY

A processor includes a novel saved interrupt enable (SIE) bit. The SIE bit may, for example, be a bit in a flags register of the processor. Upon vectoring off from a thread of instructions to a first interrupt service routine, the processor pushes the content of the flags register onto a stack, then transfers the contents of a maskable interrupt enable bit (MIE) into the saved interrupt enable (SIE) bit, and then clears the maskable interrupt enable bit (MIE) thereby disabling maskable interrupts. Disabling maskable interrupts in this way prevents a maskable interrupt received during execution of the first interrupt service routine from interrupting the first interrupt service routine.

Execution of the first interrupt service routine then occurs. If a second maskable interrupt is received during execution of the first interrupt service routine, then the second interrupt is maintained in an interrupt pending state. When the processor encounters an interrupt return (IRET) instruction at the end of the first interrupt routine, the processor executes the IRET instruction by checking the status of the SIE bit.

If the value of the SIE bit indicates that maskable interrupts were enabled at the time the first interrupt service routine was entered, and if there is a second pending unmasked interrupt, then direct vectoring occurs from the IRET instruction to a second interrupt service routine for servicing the second interrupt. The stack is not popped to recover processor state information, and processor state information is not pushed back onto the stack in this direct vectoring operation.

If, on the other hand, the value of the SIE bit indicates that maskable interrupts were disabled at the time the first interrupt service routine was entered, then the second interrupt should not be serviced but rather should remain pending. Execution of the IRET instruction therefore performs an interrupt return operation by popping the stack to obtain processor state information, and restoring the state of the processor (program counter value and flags register value) with the processor state information so that execution returns to the thread of instructions that was previously interrupted by the first interrupt.

In a typical microcontroller, interrupts have to be enabled in order to be able to vector off to an interrupt service routine to service the interrupt. Otherwise, if interrupts were not enabled, then it is assumed that there could not have been vectoring off to the interrupt service routine. Accordingly, the SIE bit would not be needed (to determine whether interrupts were enabled) if the assumption could be made that maskable interrupts had to have been enabled at the time an interrupt service routine was entered. The novel SIE bit is particularly useful, however, when the first interrupt is a non-maskable interrupt. In the situation of returning from an interrupt routine of such a non-maskable interrupt, it conventionally would not be known whether interrupts had been enabled or disabled at the time the interrupt service routine for the non-maskable interrupt was entered. The SIE bit provides this information. Execution of the novel IRET instruction checks the SIE bit and determines whether back-to-back interrupt vectoring can be performed or not.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
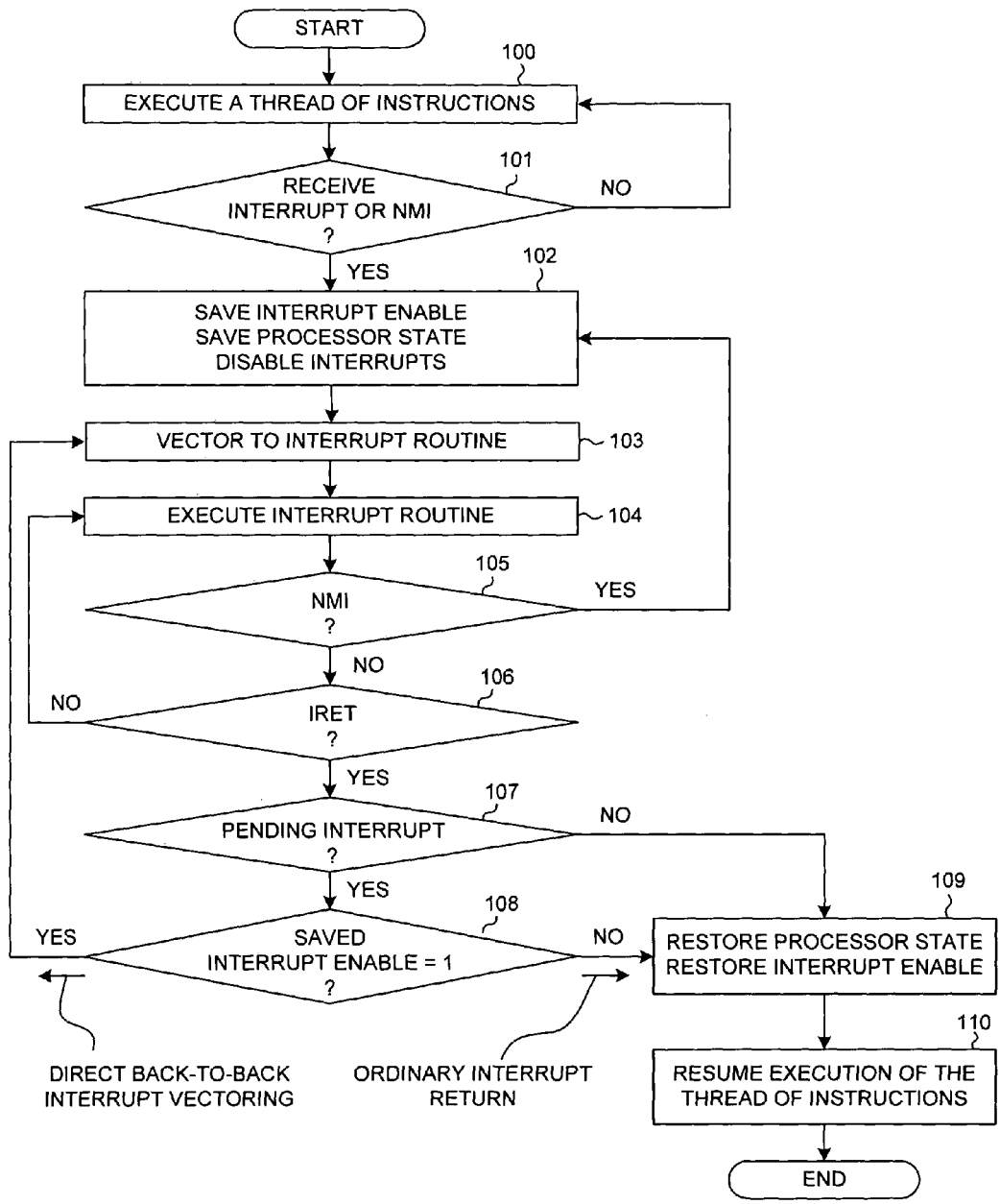
FIG. 1 is a flowchart of a method in accordance with one novel aspect.

FIG. 1 is a simplified flowchart of a method in accordance with one novel embodiment. A processor executes a set of processor-executable instructions stored on a processor-readable medium in order to carry out the method.

In the presently described embodiment, the processor is a processor of a microcontroller integrated circuit.

Figure 2:
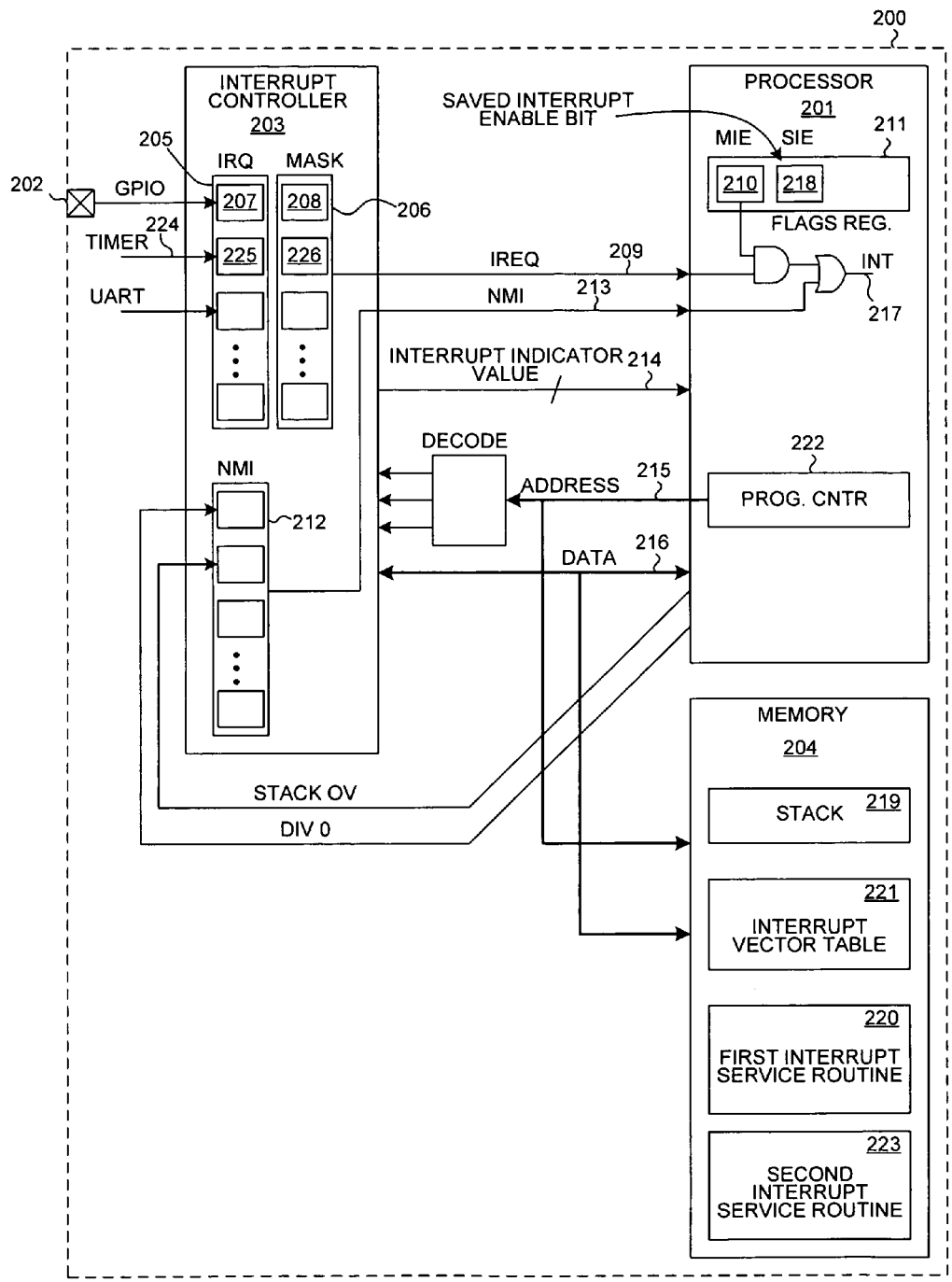
FIG. 2 is a simplified block diagram of a microcontroller integrated circuit that executes instructions in order to carry out the method of FIG. 1.

FIG. 2 is a simplified schematic block diagram of the microcontroller integrated circuit 200. Microcontroller integrated circuit 200 includes a processor 201, various on-chip peripherals (not illustrated) such as a timer and a UART (universal asynchronous receiver and transmitter), a plurality of interrupt input terminals (one of which is denoted with reference numeral 202), an interrupt controller 203, and an amount of semiconductor memory 204. The set of processor-executable instructions is stored in memory 204.

Initially (step 100 of FIG. 1), processor 201 is executing a thread of instructions. When executing an instruction of the thread, the processor fetches the instruction out of memory, decodes the instruction, and executes the instruction. For each one of interrupt input terminal 202, the timer, and the UART, there is a corresponding bit in an interrupt request register IRQ 205 and a corresponding bit in a mask register MASK 206. When an incoming interrupt signal is received onto interrupt terminal 202, the corresponding bit 207 in interrupt request register 205 is set. If the corresponding bit 208 in the mask register 206 is cleared (interrupt is masked), then the interrupt status captured in bit 207 is not communicated as an interrupt request signal (IREQ) across line 209 to processor 201. If, however, bit 208 in mask register 206 is set (interrupt is not masked), then the interrupt status captured in bit 207 is communicated across line 209 as an interrupt signal IREQ to processor 201. There is a global maskable interrupt enable bit 210 in a flags register 211 in processor 201. If this bit 210 is cleared (maskable interrupts are disabled), then the IREQ signal is prevented from generating an interrupt signal INT within processor 201. If, however, the global maskable interrupt enable bit 210 is set (maskable interrupts are enabled), then the IREQ signal generates an interrupt signal INT.

In addition to an interrupt signal INT being supplied to processor 201 due to a maskable interrupt signal being captured in interrupt request register IRQ 205, an interrupt signal INT can be generated due to a non-maskable interrupt condition. System exception conditions are examples of non-maskable interrupt conditions. One example of a system exception condition is detection of a divide by zero operation. Another example of a system exception condition is detection of a stack overflow condition. If one of these conditions is detected, then a corresponding bit in non-maskable interrupt register NMI 212 is set. If any bit in NMI register 212 is set, then a non-maskable interrupt request signal NMI is sent to processor 201 across line 213. A non-maskable interrupt cannot be masked. Accordingly, if the NMI signal on line 214 is asserted, then an interrupt signal INT will be supplied to processor 201 regardless of the state of the MIE bit 210 in flags register 211.

At the time the interrupt signal INT is asserted, the interrupt controller 203 also supplies a multi-bit interrupt indicator value to processor 201 on lines 214. Processor 201 uses this interrupt indicator value to determine which interrupt it was that caused assertion of the INT signal. Processor 201 can also read and write the interrupt request register 205, the mask register 206, and the NMI register 212 using the standard address and data buses 215 and 216 used to access memory 204. Interrupt controller 203 may, for example, be a standard interrupt controller of a type employed on commercially available microcontrollers.

In the next step 101 in the method of FIG. 1, a first interrupt signal is received onto interrupt terminal 202 from a source external to microcontroller integrated circuit 200. The incoming first interrupt signal causes bit 207 to be set. The first interrupt is a maskable interrupt and its mask bit 208 in mask register 206 is set (not masked). In the present example, the global maskable interrupt enable bit 210 is set (maskable interrupts are enabled). Interrupt controller 203 therefore sends an interrupt request (IREQ) signal on line 209 to processor 201 and interrupt signal INT is asserted on line 217. The method of FIG. 1 therefore proceeds to step 102.

Processor 201 responds to the interrupt signal INT by suspending execution of the thread of instructions. The interrupt indicator value on lines 214 indicates to processor 201 that the interrupt that caused the IREQ signal is the interrupt for interrupt terminal 202. In one novel aspect, the value of global maskable interrupt enable bit 210 (interrupt enable status information) is stored at this time into a novel saved interrupt enable bit SIE 218 in flags register 211. Flags register 211 is one of the standard flags registers within processor 201. In addition to bits 210 and 218, flags register 211 typically includes a carry bit, a sign bit, a zero bit, an ALU overflow bit, and a program counter overflow bit.

Once the value of the maskable interrupt enable MIE bit 210 is saved into the novel SIE bit 218, processor 201 pushes (step 102) processor state information onto a stack 219. The processor state information includes the current value of program counter 222 and the contents of flags register 211. Once the processor state information has been pushed onto stack 219, the maskable interrupt enable MIE bit 210 is automatically cleared. This clearing disables maskable interrupts and prevents future maskable interrupts that might be received during execution of a first interrupt service routine 220 from interrupting the first interrupt service routine 220.

The interrupt indicator value on lines 214 indicates the particular one of the maskable interrupts of system exception conditions that caused the interrupt. Processor 201 uses the interrupt indicator value to read the vector address out of vector interrupt table 221 that points to the start of first interrupt service routine 220. Processor 201 loads this starting address into the processor's program counter 222 (step 103), and begins executing first interrupt service routine 220 (step 104). At this point in the method, the prior state of the maskable interrupt enable bit 210 at the time of the incoming interrupt is saved in SIE bit 218 in flags register 211. The vectoring process of steps 102 and 103 is carried out by a hardware state machine instruction execution unit within processor 201.

If a non-maskable interrupt (NMI) is received (step 105) during subsequent processing of first interrupt service routine 220, then first interrupt service routine 220 is interrupted. The value of flags register 211 and the program counter 222 is pushed onto stack 219 (step 102), the MIE bit 210 is transferred to SIE bit 218, and the MIE bit 210 is cleared. Processor 201 vectors off and executes the service routine for the NMI (step 103). When the NMI service routine is completed, the processor 201 pops the stack to recover the prior processor state information including the program counter value and the content of the flags register 211. After the processor state information is used to restore the state of processor 201, processor 201 returns back to the point in the first interrupt service routine where it was when it was interrupted. This type of interruption of one interrupt service routine by another is sometimes called "nesting". The pushing of processor state information onto the stack upon entering an interrupting interrupt service routine and the subsequent popping of that state information off the stack upon returning from the interrupting routine facilitates nesting. The restoring of the contents of the flag register 211 restores the state of the MIE and SIE bits.

In the present example, however, no NMI occurs. Processing therefore proceeds from step 105 to step 106. Processor 201 continues executing the first interrupt service routine 220. In the flowchart of FIG. 1, process flow proceeds from step 105, to step 106, to step 104, and back to step 105 in a loop.

In the present example, a second maskable interrupt is received at this time during the execution of the first interrupt service routine 220. The second interrupt is an interrupt due to a timer peripheral on microcontroller integrated circuit 200 timing out. This time out condition causes an interrupt signal to be asserted onto line 224 which in turn sets bit 225 in interrupt request register 205. The mask bit 226 for this second interrupt is set (not masked), but the maskable interrupt enable MIE bit 210 in the flags register 211 is cleared (maskable interrupts are disabled) due to its having been automatically cleared upon entering the first interrupt service routine as set forth above. MIE bit 210 therefore prevents the second interrupt from causing the interrupt signal INT on line 217 to be asserted. The second interrupt therefore does not interrupt processor 201.

Processor 201 continues executing first interrupt service routine 220 until an interrupt return instruction (IRET) is encountered at the end of first interrupt service routine 220. If there is no pending interrupt, then processor 201 performs a return operation to return back to execution of the original thread of instructions. Processor 201 pops stack 219 (step 109) to recover the processor state information that had been pushed onto the stack upon entering the first interrupt service routine. The program counter 222 is reloaded with the stored program counter value that was popped off the stack. The flags register is reloaded with the stored flags register value that was popped off the stack. Processor 201 then resumes execution (step 110) of the original thread of instructions.

In the present example, however, there is a second interrupt pending at the time processor 201 encounters the IRET instruction. Execution of the IRET instruction causes the saved interrupt enable SIE bit 218 in flags register 211 to be checked. If the saved interrupt enable SIE bit is found to be in the cleared state, then maskable interrupts were disabled at the time first interrupt service routine 220 was entered. The second interrupt is therefore not to be serviced, but rather is to remain pending. The pending second interrupt cannot be serviced because a flags register value is popped off the stack and is reloaded into the flags register and the MIE bit value in the restored flags register is zero. Accordingly, processing proceeds to step 109. The processor state information is popped off stack 219 (step 109), the processor state information is loaded into processor 201, and execution of the thread of instructions resumes (step 110).

In the present example, the maskable interrupt bit 210 was not cleared upon entering the first interrupt service routine 219. Execution of the IRET instruction causes the state of the saved interrupt enable SIE bit 218 to be checked (step 108). Bit SIE is found to be in the set condition, indicating that maskable interrupts were enabled at the time that first interrupt service routine 220 was entered. Processor 201 therefore does not pop stack 219 to recover the processor state information just to push that processor state information back onto stack 219 upon vectoring off to second interrupt service routine 223. Rather, stack 219 is not popped, but rather direct back-to-back interrupt vectoring occurs. Processing does not proceed to step 109 but rather proceeds to step 103. Because the SIE bit is found to be in the set condition, execution of the IRET instruction causes the MIE bit to be cleared. Processor 201 uses the interrupt indicator value on lines 214 to identify the starting address in interrupt vector table 221 for second interrupt service routine 223. Processor 201 obtains the starting address out of vector table 221, loads it into program counter 222 (step 103), and begins execution of second interrupt service routine 223 (step 104).

Accordingly, execution of the IRET instruction does not cause maskable interrupts to be automatically enabled. Rather execution of the IRET instruction causes the value of SIE bit 218 to be checked. First condition: if the value of SIE bit 218 indicates that maskable interrupts were enabled at the time the first interrupt service routine was entered and if IREQ is asserted indicating that a second interrupt is pending, then execution of the IRET instruction causes MIE bit 210 to be cleared. Back-to-back interrupt vectoring occurs from the IRET instruction to an interrupt service routine for the second pending interrupt. Second condition: if the value of SIE bit 218 indicates that maskable interrupts were enabled at the time the first interrupt service routine was entered and IREQ is not asserted (there is no other unmasked pending interrupt), then execution of the IRET instruction causes processor state information to be popped off the stack so that a return is performed (a flags register value popped off the stack is reloaded into the flags register 211). Third condition: if the value of SIE bit 218 indicates that maskable interrupts were disabled at the time the first interrupt service routine was entered, then execution of the IRET instruction causes processor state information to be popped off the stack so that a return is performed (a flags register value popped off the stack is reloaded into the flags register 211). If another interrupt was pending, then it remains pending due to maskable interrupts being disabled.

Although the present invention has been described in connection with certain specific embodiments for instructional purposes, the present invention is not limited thereto. The SIE bit and/or IRET instruction can be incorporated into a processor other than a processor of a microcontroller. The SIE bit and/or IRET instruction can be incorporated into general purpose CPUs and DSPs and I/O controllers, and other processors. The SIE bit and/or IRET instruction can be employed in microcoded processor architectures where multiple microcoded suboperations are performed to carry out one opcode instruction. Although the SIE bit is explained above in connection with an embodiment where the SIE bit is in the flags register, the SIE bit can be a bit in a register other than the flags register and can also be implemented as a dedicated bit that is not in any register. Accordingly, various modifications, adaptations, and combinations of various features of the described embodiments can be practiced without departing from the scope of the invention as set forth in the claims.

What is claimed is:

1. A method comprising:
fetching an interrupt return instruction, wherein the interrupt return instruction is a part of a first interrupt service routine executed by a processor, the processor having a state, wherein there is a pending second interrupt, and wherein there is a second interrupt service routine for the second interrupt; and
executing the interrupt return instruction in part by checking a saved interrupt enable status bit, wherein:
if the saved interrupt enable status bit has a first value then the executing of the interrupt return instruction further includes directly vectoring from the first interrupt service routine to a second interrupt service routine without popping a stack and obtaining processor state information and without then pushing the processor state information back onto the stack; and
if the saved interrupt enable status bit has a second value then the executing of the interrupt return instruction further includes popping the stack and thereby obtaining processor state information, and restoring the state of the processor to the processor state information obtained from the stack.

2. The method of claim 1, wherein the saved interrupt enable status bit is a bit in a register, and wherein the register further includes a carry bit.

3. The method of claim 1, further comprising:
prior to the steps of fetching and executing, storing a value into the saved interrupt enable status bit and entering the first interrupt service routine, wherein the storing occurs at substantially the same time that the first interrupt service routine is entered, wherein the value has the first value if the second interrupt was disabled at the time the first interrupt service routine was entered, and wherein the value has the second value if the second interrupt was enabled at the time the first interrupt service routine was entered.

4. The method of claim 1, wherein the processor includes a maskable interrupt enable bit, the method further comprising:
prior to the steps of fetching and executing, transferring a value stored in the maskable interrupt enable bit to the saved interrupt enable status bit; and
after the transferring and before the steps of fetching and executing, storing a value into the maskable interrupt enable bit such that maskable interrupts are disabled.

5. The method of claim 1, wherein the processor includes a maskable interrupt enable bit, wherein the maskable interrupt enable bit and the saved interrupt enable status bit are bits in a register, the method further comprising:
pushing a content of the register onto the stack;
after the pushing and before the steps of fetching and executing, transferring a value stored in the maskable interrupt enable bit to the saved interrupt enable status bit; and
after the transferring and before the steps of fetching and executing, storing a value into the maskable interrupt enable bit such that maskable interrupts are disabled.

6. An interrupt return instruction stored in a processor-readable medium, wherein the instruction is executable by a processor when the processor is executing a first interrupt service routine, execution of the interrupt return instruction causing performing steps comprising:
checking a status of a bit, wherein the bit indicates whether an unmasked interrupt of the first interrupt service routine is permitted at approximately a time of entering the first interrupt service routine;
if the status of the bit has a first value and a second interrupt is pending, then directly vectoring to a starting address of a second interrupt service routine for servicing the second interrupt; and
if the status of the bit has a second value, then performing a return operation by: popping a stack and thereby obtaining processor state information, and restoring a state of the processor using the processor state information.

7. The interrupt return instruction of claim 6, wherein the vectoring includes vectoring from the first interrupt service routine to the second interrupt service routine without popping the stack.

8. The interrupt return instruction of claim 6, wherein the vectoring includes vectoring from the first interrupt service routine to the second interrupt service routine without popping any program counter value off any stack.

9. The interrupt return instruction of claim 6, wherein the bit stores interrupt enable information.

10. The interrupt return instruction of claim 6, wherein execution of a single instruction by the processor results in the checking of the status of the bit, and then either: 1) directly vectoring to the starting address of the second interrupt service routine, or 2) performing the return operation, wherein the single instruction is the interrupt return instruction.

11. A method comprising:
storing an interrupt status enable value into a stored interrupt enable bit upon vectoring to an interrupt service routine; and
executing an interrupt return instruction by checking a status of the stored interrupt enable bit, and using the status of the stored interrupt enable bit to determine whether to vector directly to another interrupt service routine or to perform an interrupt return operation.

12. The method of claim 11, wherein the storing includes transferring a content of a maskable interrupt enable bit into the stored interrupt enable bit, the method further comprising:
loading the maskable interrupt enable bit such that maskable interrupts are disabled, wherein the loading occurs after the storing and upon the vectoring.

13. The method of claim 12, wherein the maskable interrupt enable bit is a bit in a register, the method further comprising:
pushing a content of the register onto a stack, wherein the pushing occurs prior to the storing of the interrupt status enable value into the stored interrupt enable bit and prior to the loading of the maskable interrupt enable bit such that maskable interrupts are disabled.

14. A microcontroller integrated circuit that can execute an interrupt return instruction, the interrupt return instruction being an instruction in a first interrupt service routine, wherein a processor of the microcontroller integrated circuit executes the interrupt return instruction by:
checking a status of a bit;
if the status of the bit has a first value and a second interrupt is pending, then directly vectoring to a second interrupt service routine for servicing the second interrupt, wherein the directly vectoring does not involve popping a stack; and
if the status of the bit has a second value, then performing a return operation by: popping the stack and thereby obtaining processor state information, and restoring a state of the processor using the processor state information.

15. The microcontroller integrated circuit of claim 14, wherein the processor is a part of microcontroller integrated circuit, wherein the bit is part of the microcontroller integrated circuit, and wherein the stack is stored in an amount of memory on the microcontroller integrated circuit.

* * * * *